G. A. MORGAN.
POWER TRANSMISSION MECHANISM.
APPLICATION FILED JAN. 2, 1912.
1,021,159.
Patented Mar. 26, 1912.
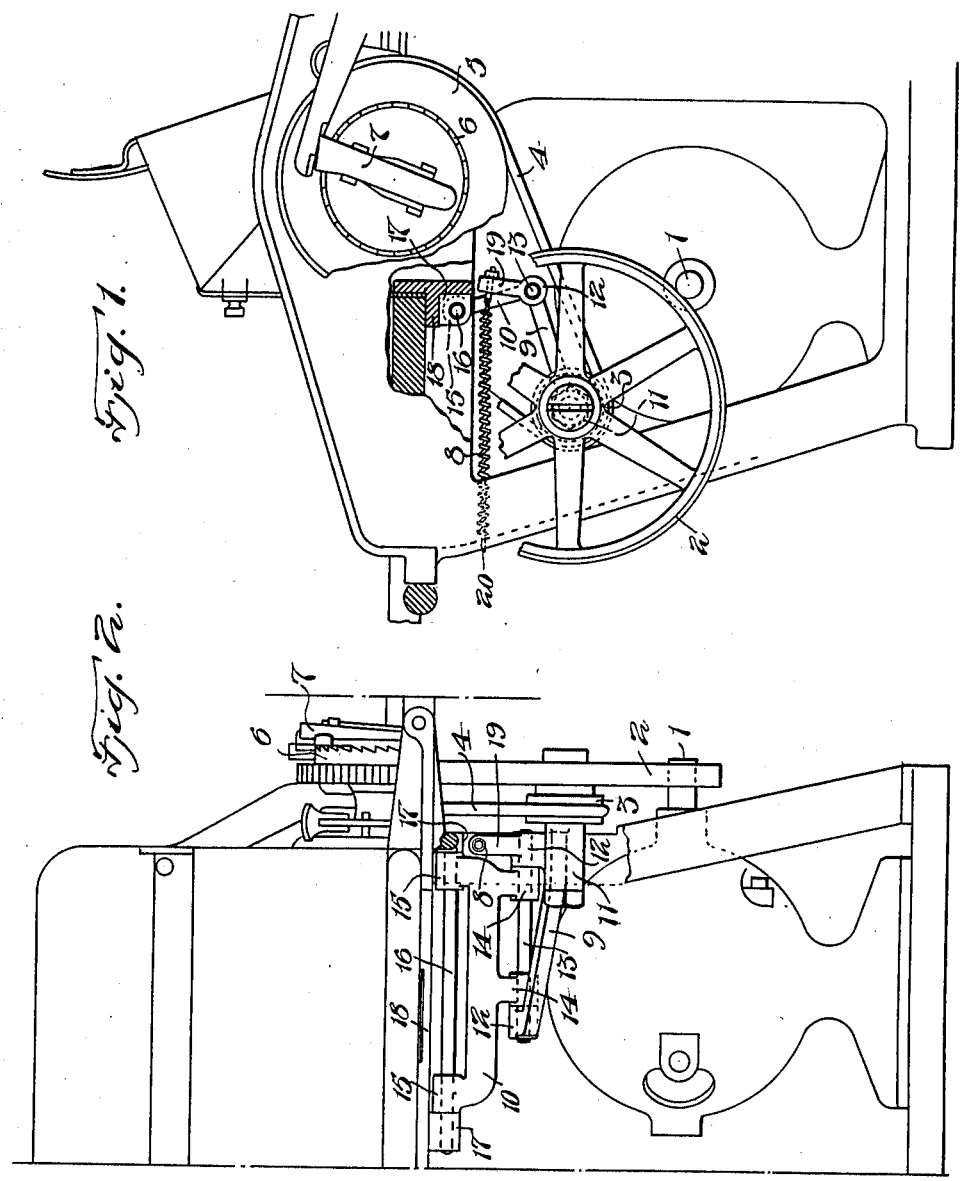
Witnesses:
O. W. Pizzetti
E. Batchelder
Inventor:
Gerry A. Morgan
by Wright, Brown, Quinby & May
Attys.

UNITED STATES PATENT OFFICE.

GERRY A. MORGAN, OF GOFFSTOWN, NEW HAMPSHIRE, ASSIGNOR TO BOSTON AUTOMATIC MACHINE COMPANY, OF BOSTON, MASSACHUSETTS, A CORPORATION OF MASSACHUSETTS.

POWER-TRANSMISSION MECHANISM.

1,021,159. Specification of Letters Patent. Patented Mar. 26, 1912.

Application filed January 2, 1912. Serial No. 669,027.

*To all whom it may concern:*

Be it known that I, GERRY A. MORGAN, of Goffstown, in the county of Hillsboro and State of New Hampshire, have invented certain new and useful Improvements in Power-Transmission Mechanism, of which the following is a specification.

The present invention relates to a means for transmission of power whereby rotation is transmitted frictionally from a driving shaft to a clutch pulley adapted to drive a second shaft, and in which one of the elements is a belt.

The object of the invention is to provide such a construction and arrangement of parts that a single resilient or yieldingly acting member, such as a spring, weight or the like, may perform at once the double function of keeping the belt tight and maintaining a sufficient pressure between the two other elements which run in frictional contact.

In the accompanying drawings I have shown an embodiment of my invention applied practically to a machine, such embodiment, although only one of several possible constructions, being that which at the present time I prefer for the particular purpose to which it is applied.

In the drawings, Figure 1 represents a side elevation of the mechanism. Fig. 2 represents an elevation as seen from the left of Fig. 1.

The same reference characters indicate the same parts in all the figures.

In the drawings, the train of elements which constitute the frictional driving mechanism comprises a friction member 1, which for the purpose of this explanation may be considered the driver, and may be a shaft, or a disk or wheel mounted upon a shaft, a complemental disk or wheel 2, a pulley 3 secured to the wheel 2, a belt 4, and a pulley 5 carrying a clutch 6 adapted to apply power to a shaft through a complemental clutch member 7. Either the rim of the wheel 2, or the circumference of the driver 1, or both may be provided with a facing of frictional material whereby the one may drive the other with the minimum amount of slip. The pulley 3 is rigidly connected to the wheel 2 so that it turns therewith. A belt 4 conveys power from pulley 5 frictionally in the ordinary well-known manner.

For the purpose of keeping a uniform tension in the belt in spite of any stretch which might occur therein, and also of maintaining a constant and uniform pressure between the wheel 2 and driver 1, I mount the composite element consisting of the wheel 2 and pulley 3 in an articulated frame, and provide a yielding actuator in the nature of a spring 8 for so moving the frame as to secure both these effects. The frame consists of two members 9 and 10 which in mechanical effect are arms, although in the illustrated embodiment they have a truss structure and a greater width than length. The arm 9 has a bearing 11 on one end which contains the pivot shaft of the wheel 2 and pulley 3, and on its other end is provided with eyes 12 containing a pivot or pintle rod 13 also held in lugs or eyes 14 in the arm 10, and forming a pivotal connection. The arm 10 also has eyes 15 containing a pintle rod 16 which makes a connecting pivot between such arm and the lugs 17 of a stationary bracket 18. The spring 8 referred to is connected at one end with a lug or finger 19 rising from the arm 9, and at its other end with a stationary abutment 20.

The line or direction in which the spring 8 acts extends generally in the direction of a line drawn between the pulley 5 and the pulley 3. It also extends at one side of the pivot 13 and at the opposite side thereof from the driver 1. Thus the same spring has the double function of swinging the arm 9 about the pivot 13 and of moving the whole arm 9 bodily and swinging the arm 10 about the pivot 16. The first of these functions presses the wheel 2 against the driver 1, and the second applies tension to the belt. It should be noted also that in order to secure these effects and obtain the desired degree of pressure and tension respectively, the presence of the belt is necessary to limit the outward swing of the arm 10, and the presence of the driver 1 is necessary as an abutment to limit the downward movement of the arm 9. Thus the belt coöperates with the spring 8 in producing friction between the driver 1 and wheel 2, and the driver coöperates with the spring in maintaining the tension of the belt. The pressure and tension respectively remain substantially constant in spite of any stretching of the belt.

It will be seen that the portion of the shaft 1 against which the wheel 2 bears is in mechanical effect a wheel or disk, and is for all practical intents and purposes the mechanical equivalent of a wheel. Accordingly for the sake of brevity of expression I have referred to this portion of the shaft as a wheel in certain of the claims. Likewise in the interest of brevity and to employ differentiating terms, I have referred in certain of the claims to the arm 9 as a holder for the wheel 2, and to the arm 10 as a support for said holder.

I claim—

1. A driving mechanism comprising contacting rotary frictional elements, means holding one of said elements in a manner permitting the same to move at the same time toward the other element and around the axis of the same, resilient constantly acting means to apply force to said member in a direction tending to give both of the described movements to it, and a belt engaged with and driven by said member and arranged to limit its movement about the axis of the other member.

2. A driving mechanism comprising a rotary driver, a rotary driven member peripherally in frictional contact with said driver, an articulated frame holding said driven member, and including pivotally connected and pivotally mounted arms, a yielding actuator connected with one of said arms eccentric to the pivot thereof, and a belt engaged with the driven member and disposed so as to limit the movement of the driven member in the direction in which the applied force acts.

3. A driving mechanism including a rotary driver, a rotary driven member in frictional contact with the driver, said driven member being freely movable toward and from the driver and also around the axis of the same, a yielding actuator arranged to apply force to the driven member, and a belt engaged with the driven member and reacting against the force applied by the yielding actuator so as to produce a resultant pressure of the driven member against the driver.

4. In a driving mechanism the combination of a swinging arm, a second arm pivoted thereto, a combined wheel and pulley mounted upon said second arm, a lug or finger projecting from said second arm eccentric to the pivot thereof, a spring applied upon said lug, a driving shaft frictionally engaging the periphery of the wheel at the opposite side of said pivot from the point of connection of the spring to the lug, a belt surrounding the pulley, and a second pulley surrounded and driven by said belt, the spring being arranged to act in a direction opposed to the pull of the belt, whereby to co-act with the shaft in maintaining tension in the belt, and with the belt in maintaining friction between the wheel and shaft.

5. The combination with coöperating friction wheels and a belt engaged with one of them, of an articulated, pivotally movable holder for the belt-engaged wheel, and a resilient, automatically movable actuator engaged with the holder and arranged to apply force thereto in a direction opposed to the pull of the belt.

6. The combination with coöperating friction wheels and a belt engaged with one of them, of a holder for the belt-engaged wheel, a movable support for said holder, to which the latter is pivoted, and means resiliently acting on said holder tending to swing the same about its pivotal connection with said support, and to move it bodily with the support.

7. The combination with coöperating friction wheels and a belt engaged with one of them, of holding means for the belt-engaged wheel constructed to permit movement of such wheel radially and also tangentially with respect to the other wheel, and a single yieldingly acting automatically movable operating device arranged to apply force to said holding means, said device being arranged to co-act with the belt in pressing one wheel toward the other, and with the last-named wheel in applying tension to the belt.

In testimony whereof I have affixed my signature, in presence of two witnesses.

GERRY A. MORGAN.

Witnesses:
CHARLES F. RICHARDSON,
GEORGE M. McGINLEY.

Copies of this patent may be obtained for five cents each, by addressing the "Commissioner of Patents, Washington, D. C."